US012756690B2

(12) United States Patent
Khessin et al.

(10) Patent No.: US 12,756,690 B2
(45) Date of Patent: Oct. 6, 2026

(54) METHOD AND SYSTEM FOR SECURING CONNECTIONS TO IOT DEVICES

(71) Applicant: Aeris Communications, Inc., San Jose, CA (US)

(72) Inventors: Yevgeny Khessin, Ann Arbor, MI (US); Narendra Sharma, Sunnyvale, CA (US); Eran Netanel, Belmont, CA (US); Syed Zaeem Hosain, San Jose, CA (US)

(73) Assignee: Aeris Communications Inc., Chicago, IL (US)

( * ) Notice: Subject to any disclaimer, the term of this patent is extended or adjusted under 35 U.S.C. 154(b) by 259 days.

(21) Appl. No.: 17/706,393

(22) Filed: Mar. 28, 2022

(65) Prior Publication Data

US 2022/0311747 A1 Sep. 29, 2022

Related U.S. Application Data

(60) Provisional application No. 63/167,270, filed on Mar. 29, 2021.

(51) Int. Cl.
*H04L 67/303* (2022.01)
*G16Y 30/10* (2020.01)
(Continued)

(52) U.S. Cl.
CPC .......... *H04L 63/0281* (2013.01); *G16Y 30/10* (2020.01); *H04L 63/101* (2013.01); *H04L 67/303* (2013.01); *H04W 4/70* (2018.02)

(58) Field of Classification Search
CPC . H04L 63/0281; H04L 63/101; H04L 67/303; H04W 4/70; G16Y 30/10
See application file for complete search history.

(56) References Cited

U.S. PATENT DOCUMENTS 7,607,174 B1 * 10/2009 Kashchenko ........... G06F 21/74 726/25
9,094,407 B1 7/2015 Matthieu
(Continued)

FOREIGN PATENT DOCUMENTS

WO 2018116123 6/2018
WO WO-2018116123 A1 * 6/2018 .......... H04L 61/4511

OTHER PUBLICATIONS

Yousuf et al., "A survey on the Internet of Things security: State-of-art, architecture, issues and countermeasures", Emerald Group Publishing Limited, May 28, 2019, 28 pages.

*Primary Examiner* — Sheways Gelagay
*Assistant Examiner* — Samikshya Poudel
(74) *Attorney, Agent, or Firm* — McAndrews Held & Malloy, Ltd.

(57) ABSTRACT

A computer-implemented method, system and computer program product for securing connections in systems including Machine to Machine (M2M) or Internet of Things (IoT) devices are disclosed. The computer-implemented method for providing end-to-end security to systems including M2M or IoT devices includes: receiving an initial device profile for at least one IoT device; learning a device profile based on data flow to and from the at least one IoT device; dynamically computing a device profile on a per-session basis or across sessions; comparing the dynamically computed device profile for the at least one IoT device with the initial device profile and/or the learned device profile for the at least one IoT device; and triggering an action if the dynamically computed device profile for the at least one IoT device does not match the initial device profile and/or the learned device profile for the at least one IoT device.

27 Claims, 6 Drawing Sheets

100

300

(51) Int. Cl.
*H04L 9/40* (2022.01)
*H04W 4/70* (2018.01)

(56) References Cited

U.S. PATENT DOCUMENTS

| | | | | |
|---|---|---|---|---|
| 9,578,033 | B2 | 2/2017 | Matthieu | |
| 9,813,433 | B2 | 11/2017 | Mcdaid | |
| 9,860,213 | B2 | 1/2018 | Branca | |
| 10,127,409 | B1 * | 11/2018 | Wade | G06F 21/75 |
| 2005/0022010 | A1 * | 1/2005 | Swander | H04L 63/0254 726/4 |
| 2011/0289308 | A1 * | 11/2011 | Sobko | G06F 21/56 709/204 |
| 2013/0117461 | A1 * | 5/2013 | Hsu | H04L 63/029 709/228 |
| 2013/0139247 | A1 * | 5/2013 | Cianfrocca | H04L 63/02 726/14 |
| 2017/0223046 | A1 * | 8/2017 | Singh | H04L 63/1491 |
| 2018/0014192 | A1 | 1/2018 | Pattar | |
| 2020/0145409 | A1 | 5/2020 | Pochuev | |
| 2021/0029156 | A1 | 1/2021 | Sharifi Mehr | |
| 2021/0392170 | A1 | 12/2021 | Kakinada | |
| 2022/0095092 | A1 * | 3/2022 | Siddam | H04L 63/102 |

* cited by examiner

200
IAF Analyzer Validates:
Payload Origin (Wireless)
Source IP
Source IMEI
Payload Size (Edge->Cloud)
Topics
Payload Sizes
Communication Frequencies
Additional Rules
IAF Analyzer
244
242
240
Cloud
238
Gateway
236
IAF Proxy
234
232
Edge Data Center
230
Gateway
228
IAF Proxy
226
224
Cell Tower
222
Gateway
220
IAF Proxy
218
216
IAF
214
212
IAF Proxy
210
208
Gateway
206
Device
204
Gateway
202
Device

300

300′

METHOD AND SYSTEM FOR SECURING CONNECTIONS TO IOT DEVICES

CROSS-REFERENCE TO RELATED APPLICATION

This application claims priority under 35 USC 119(e) to U.S. Provisional Application No. 63/167,270, filed Mar. 29, 2021, all of which is incorporated herein by reference in its entirety.

FIELD OF THE INVENTION

The present invention relates generally to securing connections in systems including Machine to Machine (M2M) or Internet of Things (IoT) devices.

BACKGROUND

Devices, whether phones, radios or other types of hardware, known as Machine to Machine (M2M) or Internet of Things (IoT) devices, that are intended to connect to networks, such as wireless or cellular networks, are enabled to connect to networks, such as by use with products such as Subscriber Identification Modules (SIMs). As M2M and IoT solutions are being deployed in high unit volumes, the need and demand for providing end-to-end security to M2M or IoT devices is increasing greatly.

SUMMARY

A computer-implemented system and method for securing connections in systems including M2M or IoT devices are disclosed. The computer-implemented method for securing connections in systems including M2M or IoT devices includes: receiving an initial device profile for at least one IoT device; learning a device profile based on data flow to and from the at least one IoT device; dynamically computing a device profile on a per-session basis or across sessions; comparing the dynamically computed device profile for the at least one IoT device with the initial device profile and/or the learned device profile for the at least one IoT device; and triggering an action if the dynamically computed device profile for the at least one IoT device does not match the initial device profile and/or the learned device profile for the at least one IoT device.

The system for securing connections in systems including M2M or IoT devices includes at least one IoT device, an IoT Application Firewall (IAF) including a proxy and a message analyzer, wherein the proxy is configured to: dynamically compute a device profile on a per-session basis or across sessions; applying the actions triggered by message analyze and the message analyzer is configured to: receive an initial device profile for at least one IoT device; learn a device profile based on data flow to and from the at least one IoT device; and trigger an action if the dynamically computed device profile for the at least one IoT device does not match the initial device profile and/or the learned device profile for the at least one IoT device.

In an embodiment, a computer program product for securing connections in systems including M2M or IoT devices is also disclosed. The computer program product stored on a non-transitory computer readable medium for providing end-to-end security to systems including M2M or IoT devices, having computer readable instructions for causing a computer to control an execution of an application for securing connections to M2M or IoT devices. The computer readable instructions include: receiving an initial device profile for at least one IoT device; learning a device profile based on data flow to and from the at least one IoT device; dynamically computing a device profile on a per-session basis or across sessions; comparing the dynamically computed device profile for the at least one IoT device with the initial device profile and/or the learned device profile for the at least one IoT device; and triggering an action if the dynamically computed device profile for the at least one IoT device does not match the initial device profile and/or the learned device profile for the at least one IoT device.

In an embodiment, the method, system and computer program product further comprise temporarily revoking and un-revoking certificates of IoT devices to implement secured connections in systems including M2M or IoT devices on large scale, based on rules including any one or more of: device misbehavior, known security vulnerabilities, business process, security attacks like denial-of-service (DoS), distributed denial-of-service (DDoS), etc.

In an embodiment, learning a device profile based on data flow to and from the at least one IoT device includes learning a device profile based on the data flow to and from the IoT devices using one or more IoT applications, wherein the one or more IoT applications provide similar operational functionality.

In an embodiment, the IAF may be implemented and deployed in layers at one or more positions in the messaging path; including, but not limited to, the IoT device transmitting the data messages; IoT gateway devices receiving the data messages; cell towers receiving and/or transmitting the data messages; edge computing systems receiving and/or transmitting the data messages; and cloud servers and IoT applications receiving and/or transmitting the data messages and hence may receive a different initial device profile and/or may learn a different device profile based on the position of the IAF in a messaging path and trigger a different action if the dynamically computed device profile at that position does not match the initial device profile at that position and/or the learned device profile at that position.

DETAILED DESCRIPTION

Figure 1:
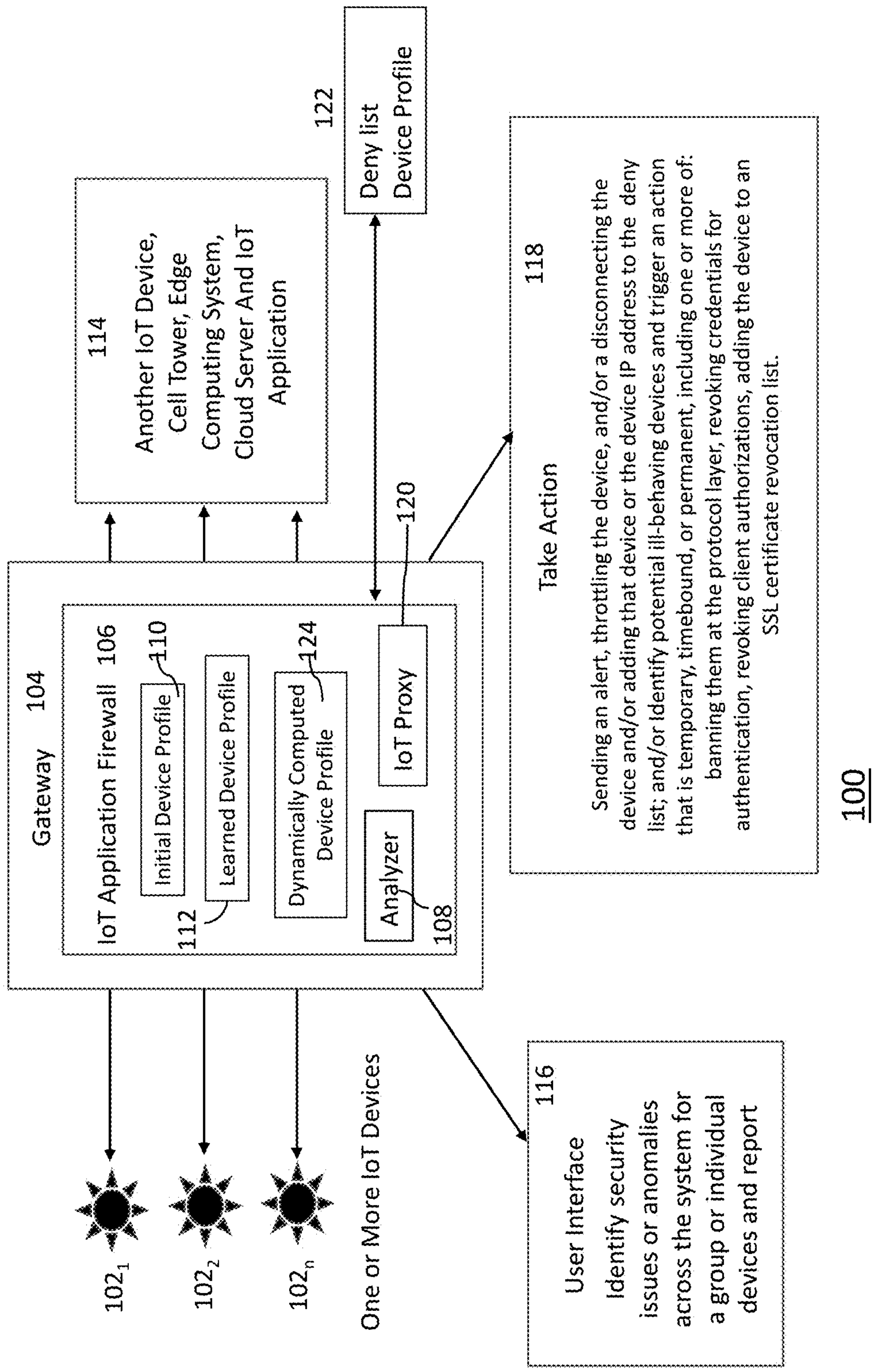
FIG. 1 illustrates an exemplary system 100 and process used for securing connections in systems including Machine to Machine (M2M) or Internet of Things (IoT) devices in accordance with one or more embodiments of the present invention.

The present invention relates generally to securing connections in systems including Machine to Machine (M2M) or Internet of Things (IoT) devices.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to product such as a Subscriber Identification Module (SIM), as used herein the term "product" is intended to be inclusive, interchangeable, and/or synonymous with appliances, electronic modules, telephony equipment and other similar products that require registration of distinct identifying numbers, such as Integrated Circuit Card Identification (ICCID)s, international mobile subscriber identity (IMSI)s, Mobile Equipment Identifier (MEID)s or other serial numbers as described further below and collectively referred to herein as "numbers", for that product with a service provider to receive services, though one will recognize that functionally different types of products may have characteristics, functions and/or operations which may be specific to their individual capabilities and/or deployment.

Devices, whether phones, radios or other types of hardware, known as M2M or IoT devices, that are intended to connect to networks, such as wireless or cellular networks, are enabled to connect to networks, such as by use with products such as SIMs. As IoT solutions are being deployed in high volume, the need and demand for providing end-to-end security to systems including M2M or IoT devices is increasing greatly. Accordingly, what are needed are system and method to address the above identified issues. The present invention addresses such a need.

The number of connected devices is on the rise, as is the security concerns around them. Many of the IoT devices including cars use IoT messaging protocols, such as, for example, Message Queuing Telemetry Transport (MQTT), as the transport for exchanging information with the application platform in the cloud. Such devices and platforms are under constant threat from hackers and also from ill-behaving valid devices. There exist systems to identify hackers based on their location, Internet Protocol (IP) address and their brute force approach. There are also systems that can detect an ill-behaving valid device based on the number of connections and amount of data sent. Both of these are not effective if the device sends several small messages on the same connection or sends one large message on a connection. Accordingly, there is a need for an application/protocol-aware firewall.

To overcome the issues described above with existing methods providing security, the application/protocol-aware firewall provides end-to-end security to systems including M2M or IoT devices as described herein.

Module and chip vendors have been including MQTT and Constrained Application Protocol (CoAP) in the base set of protocols out of the box enabling rapid development and deployment of IoT devices and services. Power companies and new building developments are moving to optimizing the electrical usage of the grid. CoAP is frequently used in modern smart energy and building automation solutions. These devices cannot perform threat detection due to their low computing power and constrained packaging.

Although the invention is described using protocols such as MQTT and CoAP as examples, a person skilled in the art may readily understand that the invention described here is applicable to other technologies using standard messaging protocols other than MQTT and CoAP and are within the spirit and scope of this invention. Additionally, use of proprietary protocols are also within the spirit and scope of this invention.

There are well-defined application firewalls for Hypertext Transfer Protocol (HTTP) transport, such as Web Application Firewall (WAF). However, there is no application firewall for IoT messaging protocols. An IoT firewall can use the connection/usage and message metadata to identify potential ill-behaving devices and trigger actions to disconnect such devices and/or also add them to a blacklist or deny-list to prevent future connections.

A mobile network operator (MNO) or mobile virtual network operator (MVNO) has visibility into the device data flows as well. By monitoring the traffic flow at both the endpoint, cloud and path in between the cloud and endpoint, end-to-end security for private IoT 5G (fifth generation technology standard) networks and current 4G (the fourth generation of broadband cellular network technology) networks can be provided. By matching payloads sent and received, location with the cloud data, device specific profiles, full end-to-end security can be provided by detecting anomalies using various rules based on learned patterns for IoT applications.

The deployment models of the future for IoT messaging protocols, such as MQTT, may include, for example, smart devices such as cars with multiple clients behind the firewall, cellular towers, network edge, and cloud. CoAP usage may increase as infrastructure is updated and low bandwidth sensors are deployed in the field.

In an embodiment, the IoT Proxy/Broker may have an internal bus proxy that transforms and pushes messages to the internal message bus. All other application platform services consume messages from the internal message bus. The internal bus proxy can create a small set of metadata for every message and publish it to another instance of the internal message bus or to a different topic on the same internal message bus. This metadata can be processed in real time by the IoT Application Firewall (IAF) and may help filter, monitor and/or block the data traffic to and from the IoT devices. The IAF can on the fly evaluate if the dynamically computed device profile for the IoT device matches the initial device profile and/or the learned device profile for that IoT device. If it does not, it may trigger an alert and/or a disconnect and add that device or the device IP address to the deny-list. The IoT proxy/broker can look up device profiles on the blacklist to deny subsequent connections to those blacklisted devices.

For CoAP, the broker can also process messages between the IoT devices by analyzing publish/subscribe patterns between the IoT devices and collecting metadata related to the device traffic. Additionally, or alternatively, in some embodiments, CoAP may use MQTT as the core transport and leverage existing IAF MQTT capabilities.

Examples of device profile attributes used for IAF rules may include any one or more of the following: 1. the number of messages per topic for a duration, which may help detect whether there is an application error or there is an isolated attack; 2. the number of messages across topics for a duration which may help detect an application error; 3. the individual payload size per topic and across topics, which may help detect whether there is an application error or there is an isolated attack; 4. aggregated payload size per topic or across topics for a duration may help detect a denial-of-service (DoS)/distributed denial-of-service (DDoS) attack; 5. authentication attempts which may help detect hackers trying to impersonate a device; 6. authorization attempts which may help detect device privilege escalation; 7. session duration; 8. fixed checksum/hash of payload per topic and across topics for a duration may help detect DoS/DDoS attack; 9. the network location of the devices may help detect impersonation of the IoT device if the network location of the device changes by, for example, 100 miles, as an IoT device abnormally jumping location may mean somebody is simulating something; 10. unexpected encryption certificate change, for example, signature changes, cipher changes, subject changes; 11. mismatched network and/or device identifiers; and 12. unexpected content in the data, for example, illegal values from a sensor, change of units of sensor values, etc.

To describe the features of the present invention in more detail within the context of IoT devices with products such as SIMs installed in them, for example, vehicles or sensors, refer to the accompanying figures in conjunction with the following discussions. These examples are used for purpose of illustration only, and should not be construed as limitations.

The embodiments described herein disclose a computer-implemented method and system for securing connections in systems including M2M or IoT devices.

A computer-implemented system and method for securing connections in systems including M2M or IoT devices are disclosed. The computer-implemented method for securing connections in systems including M2M or IoT devices includes: receiving an initial device profile for at least one IoT device; learning a device profile based on data flow to and from the at least one IoT device; dynamically computing a device profile on a per-session basis or across sessions; comparing the dynamically computed device profile for the at least one IoT device with the initial device profile and/or the learned device profile for the at least one IoT device; and triggering an action if the dynamically computed device profile for the at least one IoT device does not match the initial device profile and/or the learned device profile for the at least one IoT device.

The system for securing connections in systems including M2M or IoT devices includes at least one IoT device, an IAF including a proxy and a message analyzer, wherein the proxy is configured to: dynamically compute a device profile on a per-session basis or across sessions; implementing the actions triggered by message analyzer and the message analyzer is configured to: receive an initial device profile for at least one IoT device; learn a device profile based on data flow to and from the at least one IoT device; and trigger an action if the dynamically computed device profile for the at least one IoT device does not match the initial device profile and/or the learned device profile for the at least one IoT device.

In an embodiment, a computer program product for securing connections in systems including M2M or IoT devices is also disclosed. The computer program product stored on a non-transitory computer readable medium for providing end-to-end security to systems including M2M or IoT devices, having computer readable instructions for causing a computer to control an execution of an application for providing end-to-end security to M2M or IoT devices. The computer readable instructions include: receiving an initial device profile for at least one IoT device; learning a device profile based on data flow to and from the at least one IoT device; dynamically computing a device profile on a per-session basis or across sessions; comparing the dynamically computed device profile for the at least one IoT device with the initial device profile and/or the learned device profile for the at least one IoT device; and triggering an action if the dynamically computed device profile for the at least one IoT device does not match the initial device profile and/or the learned device profile for the at least one IoT device.

In an embodiment, the method, system, and computer program product further comprise revoking to implement end-to-end security to systems including M2M or IoT devices on large scale, including temporarily revoking and un-revoking certificates of IoT devices based on rules including any one or more of: device misbehavior, business process (for example, a device is allowed to send a specific message only if it sends a previous message of a certain type, etc., known security vulnerabilities, business process, security attacks like DOS, DDOS, etc.).

The deployment of the method, system and computer program product providing end-to-end security to systems including M2M or IoT devices may take place at various different positions of the messaging path such as in the cloud or edge, where edge deployment may take place on the factory floor for smart vehicles. Another way of deployment is at the network edge such as a cell tower or telco data center.

An MNO or MVNO can use this method to implement a secure IoT proxy for existing automotive programs. Further it can be leveraged by public cloud IoT proxies to detect anomalies based on application profiles which may be configured using Web Application Firewall (WAF) rules. A specialized device gateway with capabilities to analyze data to and from the device may lend itself to data analysis, as it may include metrics of data attributes including, but not limited to, any one or more of: the number of messages per topic for a duration; the number of messages across topics for a duration; the individual payload size per topic and across topics; the aggregated payload size per topic or across topics for a duration; the fixed checksum/hash of payload per topic and across topics for a duration; the network location of the device; encryption certificate attributes, for example, signature changes, cipher changes, subject changes; network and/or device identifiers, for example, mismatched network and/or device identifiers; and content metadata in the data, for example, illegal values from a sensor, change of units of sensor values, etc. that may be gathered off of a vehicle or IoT device. The collected information can also be presented to a User via an Interface that can identify any security issues or anomalies across the system for an individual device or a group of devices.

The method and system may be used by an MVNO providing a connectivity core function to take action (for example, block/disconnect/reroute) on the device much closer to the edge, for example, cell tower. The device profile can be augmented with additional data from an MVNO.

Thus, in an embodiment, the IAF may be implemented and deployed in layers at one or more positions in the messaging path; including, but not limited to, the IoT device transmitting the data messages; IoT gateway devices receiving the data messages; cell towers receiving the data messages; edge computing systems receiving the data messages; and cloud servers and IoT applications receiving the data messages. Based on its position in the messaging path, the IAF at each layer may receive a different initial profile for the one or more IoT devices and learn a different device profile based on data flow to and from the one or more IoT devices.

The IAF proxy may dynamically compute a device profile on a per session basis or across sessions, based on its position in the messaging path. IoT proxy is a component that is in the message path. It is responsible for computing message metadata and optionally, stream a copy of the messages to message analyzer, publishing message metadata to message analyzer periodically or based on events like disconnect, and implement actions triggered by message analyzer. The streamed copy of the messages sent to the message analyzer may be used to optionally augment the dynamically computed device profile by the message analyzer.

The IAF message analyzer, also referred to herein as IAF analyzer or message analyzer or analyzer, may learn a device profile for one or more IoT devices based on data flow to and from the IoT devices from the one or more IoT devices in that IoT application, and/or from the one or more IoT devices in other IoT applications providing similar operational functionality based on its position in the messaging path. The IAF message analyzer, also referred to herein as IAF analyzer or message analyzer, is a component for computing all the profiles, compare them and trigger actions. It may have some subcomponents, such as, but not limited to: a. current profile manager, which is responsible for creating the dynamically computed device profile using the metadata from proxy and optionally, copy of messages; b. analysis component, which is responsible for storing and analyzing past data using machine learning algorithms and updating the initial device profile to construct learned profile; and c. action component, which is responsible for comparing the current profile with learned profile, and trigger actions.

The IAF message analyzer, also referred to herein as IAF analyzer or message analyzer or analyzer, may be deployed in cloud or at the gateway.

The IAF message analyzer may then compare the initial device profile for the one or more IoT devices and the learned device profile for the one or more IoT devices, with the current instance of data flow to and from the IoT devices for the one or more devices and trigger an action if the current instance of data flow, also referred to herein as dynamically computed device profile, for the one or more devices does not match the initial device profile and/or the learned device profile for the one or more IoT devices.

As described above, the initial device profile and/or the learned device profile for the device may be different for each IAF based on its position in the messaging path. Thus, the IAF at each position in each layer may operate differently. It may have a different initial device profile (based on what that position is and what the IAF can look at), and/or a different learned device profile, and take different actions.

The method and system according to one or more embodiments of the invention described herein works by is producing a matrix of data attributes including, but not limited to, any one or more of: the destination IP address or URL for the IoT device, frequency of transmission and/or reception for the device, time and duration of data transmission and/or reception for the device, the number of messages per topic for a duration; the number of messages across topics for a duration; the individual payload size per topic and across topics; the aggregated payload size per topic or across topics for a duration; the fixed checksum/hash of payload per topic and across topics for a duration; the network location of the device; encryption certificate attributes, for example, signature changes, cipher changes, subject changes; network and/or device identifiers, for example, mismatched network and/or device identifiers; and content and metadata in the data, for example, illegal values from a sensor, change of units of sensor values, etc. that may be gathered off of a vehicle or IoT device, etc.

For HTTP transactions, the data is analyzed per transaction by the WAF, where every message that comes in is checked for an attack along with an additional set of rules including, for example, how fast the data comes in, the number of bytes per connection, etc. However, the WAF may miss the potential attack if the attack is coming in at a slower rate or if it is violating the profile of an application.

The disclosed system and method overcome these drawbacks. Initially, an initial device profile is entered in the system. Because IoT devices are programmed with a certain logic, they follow certain patterns, and, thus, an initial data traffic profile for the IoT devices may be known. However, once the device starts operating on the network, the device traffic is analyzed via machine learning and is known as a learned device profile for that device. Ongoing data traffic is analyzed to dynamically compute a device profile of the IoT device which is compared against this learned device profile, alternatively, or in addition to, the initial device profile, which is also known as a static device profile or a provisioned device profile.

Once the performance of the learned device profiles are validated and improved with ongoing data flow to and from the IoT device, and ongoing data traffic analysis, the learned device profiles may entirely replace the initial device profiles for comparison and use. The disclosed system and method may also use the dynamically computed device profiles to update the learned device profiles as a normal function of machine learning processing to correct for data drift.

The system and method disclosed herein uses rules based on data traffic attributes including, but not limited to, any one or more of: the number of messages per topic for a duration; the number of messages across topics for a duration; the individual payload size per topic and across topics; the aggregated payload size per topic or across topics for a duration; the fixed checksum/hash of payload per topic and across topics for a duration; the network location of the device; encryption certificate attributes, for example, signature changes, cipher changes, subject changes; network and/or device identifiers, for example, mismatched network and/or device identifiers; and content metadata in the data, for example, illegal values from a sensor, change of units of sensor values, etc. that may be gathered off of a vehicle or IoT device, etc.

In an embodiment, the method and system also provide a way to implement surveillance, where a user may define the criteria for quarantining a particular IoT device such as a car, for example, to learn more information about why it is misbehaving and create a profile against the vulnerability.

Such continuous monitoring of device traffic and detecting attacks by learning device profiles and performing real-time analysis for millions of IoT devices deployed at various locations, in various time zones, is not practically possible for humans to perform. For example, in the automotive field, many automotive programs use messaging protocols such as MQTT and security is high on their list. Vehicles must be safe and secure. Similarly, utility power companies provide critical services to their customers and cannot be "down" for multiple days if an attack takes place.

CoAP security is an important concern for these networks to prevent the "spread" of such attacks.

In an embodiment, the method, system and computer program product further comprise revoking to implement end-to-end security to M2M or IoT devices on large scale, including temporarily revoking and un-revoking certificates of IoT devices based on rules including any one or more of: device misbehavior, business process, (for example, a device is allowed to send a specific msg only if it sends a previous msg of a certain type, etc., known security vulnerabilities, business process, security attacks like DOS, DDOS) etc. Usually, it is hard to turn off devices at the front gate and a business logic must be implemented. Using Certificate Revocation List (CRL) as a temporary mechanism to throttle traffic may be used to add and remove devices from dynamic CRL to control access. This may be helpful in developing a technique to implement DDOS for large scale deployments, quarantining IP sources, or pushing quarantined devices to the edges. With this technique, a backend business logic can turn off access for device at the front end (for example, cloud edge, telco edge, or even at the edge itself) where the TLS is terminated and prevent from bothering the business logic from being executed to know which device is accessing in order to block them for some time.

The method and system described herein provides a generic solution for various industries using IoT devices such as vehicles, sensors, etc. for detecting, for example, compromised credentials, compromised devices, and/or compromised networks.

To describe the features of the present invention in more detail within the context of the automotive industry, refer to the accompanying figures in conjunction with the following discussions. These examples are used for purpose of illustration only, and should not be construed as limitations.

FIG. 1 illustrates an exemplary system and process 100 used for securing connections in systems including M2M or IoT devices in accordance with one or more embodiments of the present invention. In an embodiment, the system 100 includes one or more IoT devices, an IoT messaging gateway provided with an IAF 106 that is application aware and can learn the profile of the device traffic on the fly via machine learning as more and more traffic passes through the IoT messaging gateway 104. The IAF 106 is provided with an initial device profile 110 for each IoT device, for example, $\mathbf{102}_1$, $\mathbf{102}_2$, . . . $\mathbf{102}_n$, etc. The IAF/IoT proxy 120, processes the data flow via IoT messaging gateway to and from that IoT device, for example, $\mathbf{102}_1$, $\mathbf{102}_2$, . . . $\mathbf{102}_n$, etc., dynamically computes a device profile on a per-session basis or across sessions and stores the dynamically computed device profile 124.

The IAF proxy 120 may dynamically compute a device profile on a per session basis or across sessions, based on its position in the messaging path. IoT proxy also referred to herein as IAF proxy is a component that is in the message path. It is responsible for computing message metadata and optionally, stream a copy of the messages to message analyzer, publishing message metadata to message analyze periodically or based on events like disconnect and implement actions triggered by message analyzer. The streamed copy of the messages sent to the message analyzer may be used by the message analyzer to augment the dynamically computed device profile.

The IAF analyzer 108 is provided with initial device profile 110. It uses the history of dynamically computed device profile and machine learning algorithms to build the learned device profile 112. It then uses the learned device profile 112 along with the initial device profile 110 to evaluate if the dynamically computed device profile for the IoT device for the current session or sessions matches the expected device profile for that IoT device. This is illustrated in FIGS. 2A, 2B, 3A and 3B and described in detail in the description accompanying FIGS. 2A, 2B, 3A and 3B.

As described above, the IAF analyzer 108 may learn a device profile for one or more IoT devices based on data flow to and from the IoT devices from the one or more IoT devices in that IoT application, and/or from the one or more IoT devices in other IoT applications providing similar operational functionality based on its position in the messaging path. The IAF analyzer 108 is a component for computing all the profiles, compare them and trigger actions. It may have some subcomponents, such as, but not limited to: a. current profile manager, which is responsible for augmenting the dynamically computed device profile using the metadata from proxy and optionally, copy of messages; b. analysis component, which is responsible for storing and analyzing past data using machine learning algorithms and updating the initial device profile to build learned profile; and c. action component, which is responsible for comparing the current profile with learned profile, and trigger/select actions, which are them implemented by the IAF proxy 120.

The IAF message analyzer, also referred to herein as IAF analyzer or message analyzer or analyzer may be deployed in cloud or at the gateway, along with IoT Proxy as a single package (IAF) if the compute resources and use cases allow.

In an embodiment, the initial device profile 110 for at least one IoT device, for example, $\mathbf{102}_1$, $\mathbf{102}_2$, . . . $\mathbf{102}_n$, etc., includes one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one device, encryption certificate attributes, network and/or device identifiers and content metadata in the data, etc.

In an embodiment, the learned device profile 112 for the at least one IoT device, for example, $\mathbf{102}_1$, $\mathbf{102}_2$, . . . $\mathbf{102}_n$, etc., includes one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one IoT device, encryption certificate attributes, network and/or device identifiers and content metadata in the data, etc.

The dynamic computation of a device profile on a per-session basis or across sessions may include computing the device profile for the device when a single session is open at a time for the device, multiple sessions are open at a time for the device, or multiple sessions which open and close over a period of time for that device. The device profile may be represented as a per device profile in case of complex device, for example, a vehicle or a connected home, or it may be represented as an aggregated application profile in case of simple devices, for example, connected chair or smart meter. Additionally, or alternatively, the learned device profile may also be an aggregate learned device profile for a group of devices of the same type.

In an embodiment, dynamically computing/detecting the device profile based on a per-session basis or across sessions, includes analyzing ongoing data traffic for the at least one IoT device based on any one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one IoT device, encryption certificate attribute change for example, signature changes, cipher changes, subject changes, network and/or device identifiers changes, for example, mismatched network and/or device identifiers, and content metadata change in the data, for example, illegal values from a sensor, change of units of sensor values, etc. that may be gathered off of a vehicle or IoT device, etc. This dynamically computed device profile is then checked against the learned device profile and/or initial device profile to detect anomalous behavior.

Thus, the IAF analyzer 108 may use an initial device profile 110 along with a learned device profile 112 for that IoT device as well as dynamically computed device profile 124 on a per-session basis or across sessions to evaluate if the dynamically computed device profile under observation or the current device profile for the IoT device matches the expected device profile for that IoT device. If it does not match, it may trigger an alert and/or a disconnect and add that device or the device IP address to the deny-list. The IoT proxy/broker 120 can look up device profiles on the deny-list 122 and may deny subsequent connections to those deny-listed devices. In an embodiment, the IAF analyzer 106 may take an action 118, that include any one or more of: trigger an alert, throttle the device and/or a disconnect and add that device or the device IP address to the deny list.

In an embodiment, the IAF 106 may use the connection and message metadata to identify potential ill-behaving devices and trigger actions 118, which may be temporary, timebound, or permanent, to disconnect and ban such devices via methods that include any one or more of: banning them at the protocol layer (for example, MQTT/CoAP); revoking credentials for authentication; revoking client authorizations; and/or adding the device to a SSL certificate revocation list, and once selected by the analyzer, the selected action(s) may be implemented by the proxy.

Figure 2A:
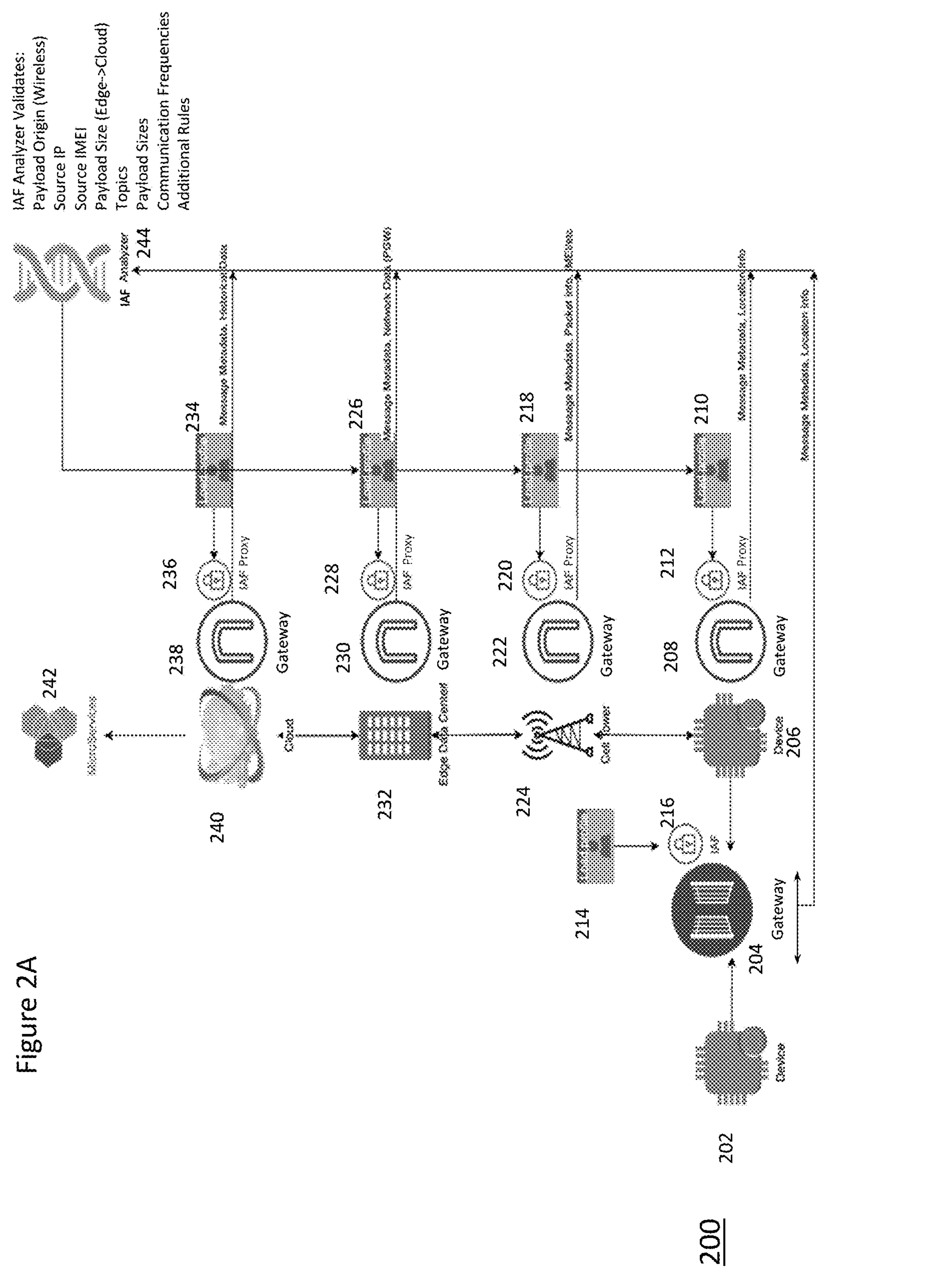
FIG. 2A illustrates an exemplary system 200 and process used for securing connections in systems including M2M or IoT devices in accordance with one or more embodiments of the present invention.
Figure 2B:
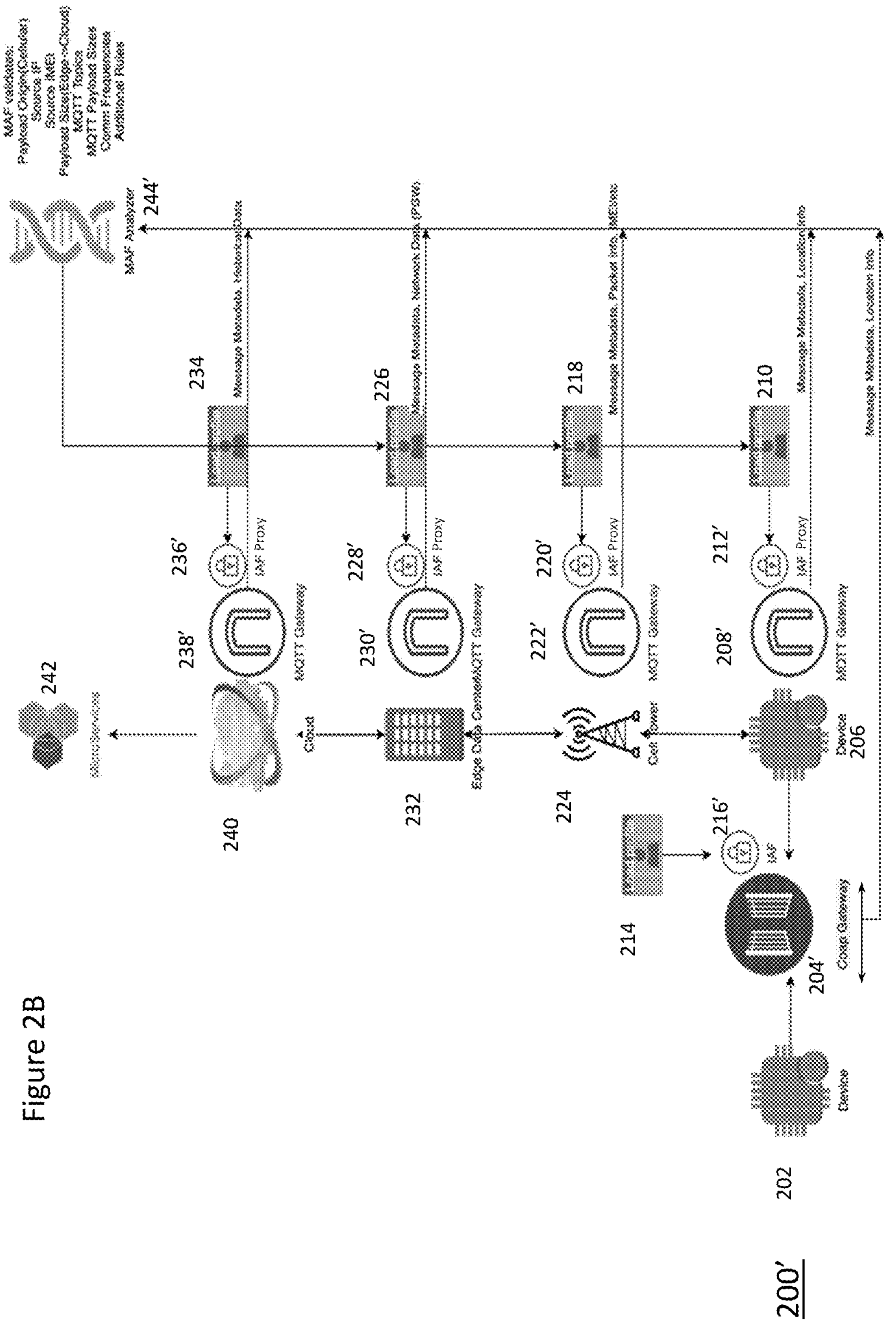
FIG. 2B illustrates an exemplary system 200' and process using Constrained Application Protocol (CoAP) and Message Queueing Telemetry Transport (MQTT) messaging gateways and protocols for securing connections in systems including M2M or IoT devices in accordance with one or more embodiments of the present invention.

In an embodiment, the IAF 106 may be implemented in one place in the cloud. However, it may also be implemented at various positions of the messaging path, including, for example, cloud, enterprise, home, cell tower (TELCO edge), or the device itself as illustrated in FIGS. 2A and 2B and described in detail in the description accompanying FIGS. 2A and 2B. An initial device profile as well as a learned device profile may be available for the IoT device at each layer or at any of the layers.

Thus, in an embodiment, the IAF 106 may be implemented and deployed in layers at one or more positions in the messaging path; including, but not limited to, the IoT device transmitting the data messages; IoT gateway devices receiving the data messages; cell towers receiving the data messages; edge computing systems receiving the data messages; and cloud servers and IoT applications receiving the data messages. Based on its position in the messaging path, the IAF at each layer may receive a different initial device profile for the one or more IoT devices and learn a different device profile based on data flow to and from the one or more IoT devices.

The IAF proxy 120 may dynamically compute a device profile on a per session basis or across sessions, based on its position in the messaging path. The IAF may learn a device profile for one or more IoT devices based on data flow to and from the IoT devices from the one or more IoT devices in that IoT application, and/or from the one or more IoT devices in other IoT applications providing similar operational functionality based on its position in the messaging path.

IoT proxy also referred to herein as IAF proxy 120 is a component that is in the message path. It is responsible for computing message metadata and optionally, stream a copy of the messages to message analyzer, publishing message metadata to message analyzer periodically or based on events like disconnect and implement actions triggered by message analyzer 108. The streamed copy of the messages sent to the message analyzer 108 may be used by the message analyzer 108 to augment the dynamically computed device profile.

The IAF/message analyzer 108 may then compare the learned device profile for the one or more IoT devices and the initial device profile for the one or more IoT devices, with the current instance of data flow, also referred to herein as dynamically computed device profile, to and from the IoT devices for the one or more devices and trigger an action if the current instance of data flow for the one or more devices does not match the initial device profile and/or the learned device profile for the one or more IoT devices.

As described above, the initial device profile 110 and the learned device profile 112 for the device may be different for each IAF based on its position in the messaging path. Thus, the IAF at each position in each layer may operate differently. It may have a different initial device profile (based on what that position is and what the IAF can look at), different learned profiles, and take different actions.

A person skilled in the art may understand that although a number of examples of filters and/or attributes for providing end-to-end security to systems including M2M or IoT devices are provided herein, various other attributes may be used and are within the scope of this invention.

Although the invention is described using protocols such as MQTT and CoAP as examples, a person skilled in the art may readily understand that the invention described here is applicable to other technologies using protocols other than MQTT and CoAP and are within the scope of this invention.

FIG. 2A illustrates an exemplary system 200 and process for securing connections in systems including M2M or IoT devices in accordance with one or more embodiments of the present invention. In an embodiment, the system 200 and process for providing end-to-end security to M2M or IoT devices includes IoT devices 202,206 and a IoT messaging gateways, for example, IoT gateway 204 and IoT gateway 208. The IoT device 202 may be a sensor, for example, a house with a IoT sensors connected to a gateway, a factory with different machines as industrial IoT devices connected to a gateway, a vehicle as a moving IoT device, etc. and includes IoT application to send and receive data, and is connected to a cell tower 224 of a network provider, which may be an MNO or an MVNO via IoT messaging gateway 208, in which case the gateway can implement the firewall as IAF illustrated as 212, 220, 228, 236 etc.

In an example, devices 202 and 206 may be different electronic control units (ECUs) connected via gateway 208 in a vehicle. In another example, devices 202 and 206 could be different vehicles communicating with other vehicles, or between a vehicle and infrastructure, using V2X. A person skilled in the art may readily recognize that other wired or wireless technologies such as CANBus or ethernet or flexray may also be used and are within the spirit and scope of this invention.

In an exemplary data flow illustrated by FIG. 2A, the data may flow through each layer of the stack such as, device 202 to IoT Gateway 204 to cell tower 224 via IoT messaging gateway 208 running on device 206, from cell tower 224 to edge data content 232 via IoT messaging gateway 222, from edge data content 232 to cloud 240 via IoT messaging gateway 230, and then to microservices 242 via IoT messaging gateway 238 and vice versa.

Every time the data flows, for example, from device 202 to cell tower 224 via IoT messaging gateway 208, from cell tower 224 to edge data content 232 via IoT messaging gateway 222, from edge data content 232 to cloud 240 via IoT messaging gateway 230, and then to microservices 242 via IoT messaging gateway 238 and vice versa, the data passes through respective IoT messaging gateway. An instance of the IAF, for example, 216, 212, 220, 228, 236, etc. may be deployed on MQTT gateway for each layer, for example, 208, 222, 230, 238, respectively. The metadata for every message passing through the IoT messaging gateway is processed in real time by the proxy 236, which then may filter, monitor and/or block the IoT messaging traffic, for example MQTT or CoAP traffic or traffic using other protocols including, but not limited to, proprietary protocols, to and from the IoT devices. A person skilled in the art may readily recognize that firewalls specific for the protocols with similar functionality may be used, depending on the protocol used.

In an embodiment, the initial device profile for at least one IoT device, for example, 202, 204, may include one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one device, encryption certificate attributes, network and/or device identifiers and content metadata in the data, etc.

In an embodiment, the learned device profile for the at least one IoT device, for example, 202, 204, may include one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one IoT device, encryption certificate attributes, network and/or device identifiers and content metadata in the data, etc.

The dynamic computation of a device profile on a per-session basis or across sessions may include computing the device profile for the device when a single session is open at a time for the device, multiple sessions are open at a time for the device, or multiple sessions which open and close over a period of time for that device. The device profile may be represented as a per device profile in case of complex device, for example, a vehicle or a connected home, or it may be represented as an aggregated application profile in case of simple devices, for example, connected chair or smart meter. Additionally, or alternatively, the learned device profile may also be an aggregate learned device profile for a group of devices of the same type.

In an embodiment, dynamically computing/detecting the device profile based on a per-session basis or across sessions, includes analyzing ongoing data traffic for the at least one IoT device based on any one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one IoT device, encryption certificate attribute change for example, signature changes, cipher changes, subject changes, network and/or device identifiers changes, for example, mismatched network and/or device identifiers, and content metadata change in the data, for example, illegal values from a sensor, change of units of sensor values, etc. that may be gathered off of a vehicle or IoT device, etc. This dynamically computed device profile is then checked against the learned device profile and/or initial device profile to detect anomalous behavior.

The IAF analyzer, for example, MAF analyzer 244, is provided with the initial device profile. The IAF analyzer 244 may use the history of dynamically computed device profile and machine learning algorithms to build the learned device profile. It then uses the learned device profile along with the initial device profile to evaluate if the dynamically computed device profile for the IoT device for the current session or sessions matches the expected device profile for that IoT device. The device profile for the IoT device may include a dynamically computed device profile on a per-session basis or across sessions, and/or from IoT devices for that IoT application, and/or from IoT devices in similar types of IoT applications.

Further, the use of "topic" in the figures and description is in the context of MQTT, the alternative terminology may apply when used in other protocols. For example, the "topic" in MQTT may be synonymous to "endpoint", "path", "method", "subject" etc. in other protocols depending on the protocol.

In an embodiment, the message analyzer 244 may use the connection and message metadata to identify potential ill-behaving devices and trigger/select actions to disconnect, throttle or ban such devices via methods that include any one or more of: banning them at the protocol layer, revoking credentials for authentication; revoking client authorizations; adding the device to SSL certificate revocation list and/or adding the at least one IoT device or the device IP address for the IoT device to a deny list of devices. These actions may be temporary, timebound, or permanent and once selected by the analyzer, the selected action(s) may be implemented by the proxy.

Each IAF is application aware and works with protocols used in IoT, for example, MQTT, CoAP, other protocols including new standard and proprietary protocols, etc. The IAF can learn the profile of the device traffic on the fly via machine learning as more and more traffic passes through the gateway. The IAF is also provided with the initial device profile for each IoT device. Thus, the IAF uses the initial device profile along with the learned device profile for that IoT device to evaluate if the dynamically computed device profile for the IoT device matches the initial device profile and/or the learned device profile for that IoT device. If it does not, it may trigger an alert and/or a disconnect, throttle and/or add that device or the device IP address to the blacklist or deny list. The IoT proxy/broker can look up device profiles on the blacklist to deny subsequent connections to those blacklisted devices.

For example, for IoT messaging gateway 208, running on device 206, where the data flows between the device 202 and the cell tower 224, the metadata may include information such as message metadata, location information for the device 102 etc. Similarly, for IoT messaging gateway 2222, where the data flows between the cell tower 224 and edge data content 232, the metadata may include information such as message metadata, packet information, source International Mobile Equipment Identity (IMEI), etc. For IoT messaging gateway 230, where the data flows between the edge data content 232 and cloud 240, the metadata may include information such as message metadata, network data (PGW), payload size, etc. For IoT messaging gateway 238, where the data flows between the cloud 240 and microservices 242, the metadata may include information such as message metadata, historical information, etc.

This information is analyzed by message analyzer also referred to herein as IAF analyzer, 244, which validates the payload origin (cellular), source IP address, source IMEI, payload size, IoT messaging protocol topics, IoT messaging protocol payload sizes, common frequencies used by that device, etc. Depending on the information provided and learned there may be additional rule attributes that are used by the message analyzer 244.

The IAF message analyzer, also referred to herein as IAF analyzer or message analyzer, may be deployed in cloud or at the gateway. Although IAF analyzer and IoT proxy are shown as separate components in FIGS. 2A and 2B, they may be deployed as combined packages (IAF) on the gateway as illustrated in FIG. 1 if the computing resources and use cases allow.

In an embodiment, the IAF may be implemented in one place in the cloud. However, it may also be implemented at various positions of the messaging path as illustrated in FIG. 2A and described above, including, for example, cloud, enterprise, home, cell tower (TELCO edge), or the device itself. An initial device profile as well as a learned device profile for the IoT device may be loaded at each layer or at any of the layers.

Thus, in an embodiment, the IAF may be implemented and deployed in layers at one or more positions in the messaging path; including, but not limited to, the IoT device transmitting the data messages; IoT gateway devices receiving the data messages; cell towers receiving the data messages; edge computing systems receiving the data messages; and cloud servers and IoT applications receiving the data messages. Based on its position in the messaging path, the IAF at each layer may receive a different initial profile for the one or more IoT devices and learn a different device profile based on data flow to and from the one or more IoT devices.

The IAF, for example, IAF proxy, for example, 216, 212, 220, 228, 236 etc., may dynamically compute a device profile on a per session basis or across sessions based on its position in the messaging path. The IAF may learn a device profile for one or more IoT devices based on data flow to and from the IoT devices from the one or more IoT devices in that IoT application, and/or from the one or more IoT devices in other IoT applications providing similar operational functionality based on its position in the messaging path.

The IAF/message analyzer 244 may then compare the initial device profile for the one or more IoT devices and the learned device profile for the one or more IoT devices, with the current instance of data flow to and from the IoT devices for the one or more devices and trigger an action if the current instance of data flow for the one or more devices does not match the initial device profile and/or the learned device profile for the one or more IoT devices.

As described above, the initial device profile and/or the learned device profile for the device may be different for each IAF based on its position in the messaging path. Thus, the IAF at each position in each layer may operate differently. It may have a different initial device profile (based on what that position is and what the IAF can look at), different learned profiles, and take different actions.

In an embodiment, the system may include an IoT messaging gateway 204 such as, but not limited to, a CoAP gateway, for example, for the IoT devices such as sensors with limited CPU power, limited memory, bandwidth etc. as opposed to IoT messaging gateway such as, but not limited to, an MQTT gateway for IoT devices such vehicles with some CPU power. In such case, the IoT device 202 with IoT messaging gateway 204 may be connected to the cell tower 224 via another device 206 through IoT messaging gateway 208. The data flow may then continue as described above, for example, from cell tower 224 to edge data content 232 via IoT messaging gateway 222, from edge data content 232 to cloud 240 via IoT messaging gateway 230, and then to microservices 242 via IoT messaging gateway 238 and vice versa.

Additionally, or alternatively, an instance of IAF 216 may be implemented on CoAP gateway 204 similar to the one described above and uses an initial device profile along with a learned device profile for that IoT device 202 to evaluate if the dynamically computed device profile for the IoT device 202 matches the expected device profile for that IoT device 202. If it does not, it may trigger an alert and/or a disconnect and add that device or the device IP address to the deny-list. The IoT proxy/broker can look up device profiles on the deny-list to deny subsequent connections to those blacklisted devices.

For the data that flows between the device 202 and IoT messaging gateway 204, the metadata may include information such as message metadata, location information for the device 202 etc. This information is analyzed by message analyzer 244, which validates the payload origin, source IP address, source IMEI, payload size, IoT messaging protocol topics, IoT messaging protocol payload sizes, common frequencies used by that device, etc. Depending on the information provided and learned there may be additional rule attributes that are used by the message analyzer 244.

The metadata for every message passing through the IoT messaging gateway is processed in real time by the IAF proxy, for example, 212, 216, 220, 228, 236, etc., which then may filter, monitor and/or block the data traffic to and from the IoT devices. The message analyzer 244 constructs a learned device profile from the data flow/traffic to and from the IoT device.

In an embodiment, the message analyzer 244 may use the connection and message metadata to identify potential ill-behaving devices and trigger or select actions to disconnect and ban such devices via methods that include any one or more of: banning them at the protocol layer; revoking credentials for authentication; revoking client authorizations; and/or adding the device to a Secure Socket Layer (SSL) certificate revocation list, and once selected by the analyzer, they may be implemented by the proxy.

Once the performance of the learned device profiles are validated and improved with ongoing data flow to and from the IoT device, and ongoing data traffic analysis, the learned device profiles may entirely replace the initial device profiles for comparison and use. The disclosed system and method may also use the dynamically computed device profiles to update the learned device profiles as a normal function of machine learning processing to correct for data drift.

FIG. 2B illustrates an exemplary system 200' and process for providing end-to-end security to systems including M2M or IoT devices in accordance with an embodiment of the present invention, using MQTT and CoAP protocols. A person skilled in the art may readily understand that other messaging protocols, including new industry standard protocols as well as proprietary message protocols, may be used in this system and method and are within the spirit and scope of this invention.

In an embodiment, the system 200' and process for providing end-to-end security to M2M or IoT devices includes an IoT device 202, 206, and a CoAP gateway 204' and MQTT gateway 208'. The IoT device 202 may be a sensor, for example, a house with a IoT sensors connected to a gateway, a factory with different machines as industrial IoT devices connected to a gateway, a vehicle as a moving IoT device, etc. and includes IoT application to send and receive data, and is connected to a cell tower 224 of a network provider, which may be an MNO or an MVNO via MQTT gateway 208', in which case the gateway can implement the firewall as IAF illustrated as 212, 220, 228, 236 etc.

An exemplary data flow is illustrated by FIG. 2B. For example, the data may flow through each layer of the stack such as, device 202 to CoAP Gateway 204' to cell tower 224 via MQTT gateway 208' running on device 206, from cell tower 224 to edge data content 232 via MQTT gateway 222', from edge data content 232 to cloud 240 via MQTT gateway 230', and then to microservices 242 via MQTT gateway 238' and vice versa.

Every time the data flows, for example, from device 202 to cell tower 224 via MQTT gateway 208', from cell tower 224 to edge data content 232 via MQTT gateway 222', from edge data content 232 to cloud 240 via MQTT gateway 230', and then to microservices 242 via MQTT gateway 238' and vice versa, the data passes through respective MQTT gateway. An instance of the IAF, for example, 216', 212', 220', 228', 236' etc. may be deployed on MQTT gateway for each layer, for example, 208', 222', 230', 238' respectively. The metadata for every message passing through the MQTT gateway is processed in real time by the IAF proxy, for example, 212', 216', 220', 228', 236', etc., which then may filter, monitor and/or block the MQTT or CoAP traffic to and from the IoT devices. A person skilled in the art may readily recognize that the MAF analyzer is used as an example of application firewall specific for MQTT protocol, and other firewalls specific for other protocols with similar functionality may be used depending on the protocol.

In an embodiment, the initial device profile for at least one IoT device, for example, 202, 204, may include one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one device, encryption certificate attributes, network and/or device identifiers and content metadata in the data, etc.

In an embodiment, the learned device profile for the at least one IoT device, for example, 202, 204, may include one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one IoT device, encryption certificate attributes, network and/or device identifiers and content metadata in the data, etc.

The dynamic computation of a device profile on a per-session basis or across sessions may include computing the device profile for the device when a single session is open at a time for the device, multiple sessions are open at a time for the device, or multiple sessions which open and close over a period of time for that device. The device profile may be represented as a per device profile in case of complex device, for example, a vehicle or a connected home, or it may be represented as an aggregated application profile in case of simple devices, for example, connected chair or smart meter. Additionally, or alternatively, the learned device profile may also be an aggregate learned device profile for a group of devices of the same type.

In an embodiment, dynamically computing/detecting the device profile based on a per-session basis or across sessions, includes analyzing ongoing data traffic for the at least one IoT device based on any one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one IoT device, encryption certificate attribute change for example, signature changes, cipher changes, subject changes, network and/or device identifiers changes, for example, mismatched network and/or device identifiers, and content metadata change in the data, for example, illegal values from a sensor, change of units of sensor values, etc. that may be gathered off of a vehicle or IoT device, etc. This dynamically computed device profile is then checked against the learned device profile and/or initial device profile to detect anomalous behavior.

The IAF analyzer, for example, MAF analyzer 244, is provided with the initial device profile. Additionally, the IAF analyzer 244 may use the history of dynamically computed device profile and machine learning algorithms to build the learned device profile. It then uses the learned device profile along with the initial device profile to evaluate if the dynamically computed device profile for the IoT device for the current session or sessions matches the expected device profile for that IoT device. The dynamically computed device profile for the IoT device may include dynamically computed device profile on a per-session basis or across sessions, and/or from IoT devices for that IoT application, and/or from IoT devices in similar types of IoT applications.

In an embodiment, the MAF analyzer 244' may use the connection and message metadata to identify potential ill-behaving devices and trigger or select actions to disconnect, throttle or ban such devices via methods that include any one or more of: banning them at the protocol layer (for example, MQTT or CoAP); revoking credentials for authentication; revoking client authorizations; adding the device to SSL certificate revocation list and/or adding the at least one IoT device or the device IP address for the IoT device to a deny list of devices, and once selected by the analyzer, they may be implemented by the proxy. These actions may be temporary, timebound, or permanent.

Each IAF is application aware and works with messaging protocols used in IoT, for example, MQTT, CoAP, including new standard and proprietary protocols, etc. The IAF may be provided with an initial device profile for each IoT device. The IAF can learn the device profile using the data traffic on the fly via machine learning as traffic passes through the IoT messaging gateway. The IAF can then dynamically compute a device profile by analyzing ongoing data traffic. Thus, the IAF compares the computed device profile with the initial device profile and/or the learned device profile for that IoT device to evaluate if the dynamically computed device profile for the IoT device matches the initial device profile and/or the learned device profile for that IoT device. If it does not, it may trigger an alert and/or a disconnect, throttle and/or add that IoT device or the device IP address to the blacklist or deny list. The IoT proxy/broker can look up device profiles on the blacklist to deny subsequent connections to those blacklisted devices and once triggered or selected by the analyzer, they are implemented by the proxy.

For example, for MQTT gateway 208', running on device 206, where the data flows between the device 202 and the cell tower 224, the metadata may include information such as message metadata, location information for the device 202 etc. Similarly, for MQTT gateway 222', where the data flows between the cell tower 224 and edge data content 232, the metadata may include information such as message metadata, packet information, source IMEI, etc. For MQTT gateway 230', where the data flows between the edge data content 232 and cloud 240, the metadata may include information such as message metadata, network data (PGW), payload size, etc. For MQTT gateway 238', where the data flows between the cloud 240 and microservices 242, the metadata may include information such as message metadata, historical information, etc.

This information is analyzed by MAF analyzer 244', which validates the payload origin, source IP address, source IMEI, payload size, MQTT topics, MQTT payload sizes, common frequencies used by that device, etc. Depending on the information provided and learned, there may be additional rule attributes that are used by the MAF analyzer 244'.

The MAF message analyzer, also referred to herein as MAF analyzer or message analyzer, may be deployed in cloud or at the gateway. Although IAF analyzer and IoT proxy are shown as separate components in FIG. 2A, they may be deployed as combined packages (IAF) on the gateway if the computing resources and use cases allow.

In an embodiment, the IAF may be implemented in one place in the cloud. However, it may also be implemented at various positions of the messaging path, as illustrated by FIG. 2B, including, for example, cloud, enterprise, home, cell tower (TELCO edge) or the device itself. The initial device profile as well as the learned device profile for the IoT device profile may be loaded at each layer or at any of the layers.

Thus, in an embodiment, the IAF may be implemented and deployed in layers at one or more positions in the messaging path; including, but not limited to, the IoT device transmitting the data messages; IoT gateway devices receiving the data messages; cell towers receiving the data messages; edge computing systems receiving the data messages; and cloud servers and IoT applications receiving the data messages. Based on its position in the messaging path, the IAF at each layer may receive a different initial device profile for the one or more IoT devices and learn a different device profile based on data flow to and from the one or more IoT devices.

The IAF, for example, IAF proxy, for example, 216', 212', 220', 228', 236' etc., may dynamically compute a device profile on a per-session basis or across sessions based on its position in the messaging path. The IAF may learn a device profile for one or more IoT devices based on data flow to and from the IoT devices from the one or more IoT devices in that IoT application, and/or from the one or more IoT devices in other IoT applications providing similar operational functionality based on its position in the messaging path.

The IAF may then compare the learned device profile for the one or more IoT devices and the initial device profile for the one or more IoT devices, with the current instance of data flow, also referred to as dynamically computed device profile, to and from the IoT devices for the one or more devices and trigger an action if the current instance of data flow for the one or more devices does not match the initial device profile and/or the learned device profile for the one or more IoT devices.

As described above, the initial device profile and/or the learned device profile for the device may be different for each IAF based on its position in the messaging path. Thus, the IAF at each position in each layer may operate differently. It may have a different initial device profile (based on what that position is and what the IAF can look at), learn different profiles, and take different actions.

In an embodiment, the system may include a CoAP gateway 204', for example, for the IoT devices such as sensors with limited CPU power, limited memory, bandwidth etc. as opposed to MQTT gateway for IoT devices such vehicles with some CPU power. In such case, the IoT device 202 with CoAP gateway 204' may be connected to the cell tower 224 via another device 206 through MQTT gateway 208'. The data flow may then continue as described above, for example, from cell tower 224 to edge data content 232 via MQTT gateway 222', from edge data content 232 to cloud 240 via MQTT gateway 230', and then to microservices 242 via MQTT gateway 238' and vice versa.

Additionally, or alternatively, an instance of IAF 216 may be implemented on CoAP gateway 204' similar to the one described above and uses an initial device profile and/or a learned device profile for that IoT device 202 to evaluate if the dynamically computed device profile for the IoT device 202 matches the initial device profile and/or the learned device profile for that IoT device 202. If it does not, it may trigger an alert and/or a disconnect and add that device or the device IP address to the blacklist. The IoT proxy/broker can look up device profiles on the blacklist to deny subsequent connections to those blacklisted devices.

For the data that flows between the device 202 and CoAP gateway 204, the metadata may include information such as message metadata, location information for the device 202 etc. This information is analyzed by MAF analyzer 244', which validates the payload origin, source IP address, source IMEI, payload size, MQTT topics, MQTT payload sizes, common frequencies used by that device, etc. Depending on the information provided and learned there may be additional rule attributes that are used by the MAF analyzer 244'.

The metadata for every message passing through the MQTT gateway is processed in real time by the IAF proxy, for example, 212', 216', 220', 228', 236', etc., which then may filter, monitor and/or block the MQTT traffic to and from the IoT devices. The MAF analyzer 244' constructs a learned device profile from the data flow/traffic to and from the IoT device. The MAF is an example of an application firewall described herein, which is specifically implemented for MQTT protocol.

In an embodiment, the MAF analyzer 244' may use the connection and message metadata to identify potential ill-behaving devices and trigger/select actions to disconnect and ban such devices via methods that include any one or more of: banning them at the protocol layer, for example, MQTT/CoAP; revoking credentials for authentication; revoking client authorizations; and/or adding the device to a SSL certificate revocation list and once selected by the analyzer are implemented by the proxy, and once selected by the analyzer, the selected action(s) may be implemented by the proxy.

Once the performance of the learned device profiles are validated and improved with ongoing data flow to and from the IoT device, and ongoing data traffic analysis, the learned device profiles may entirely replace the initial device profiles for comparison and use. The disclosed system and method may also use the dynamically computed device profiles to update the learned device profiles as a normal function of machine learning processing to correct for data drift.

Figure 3A:
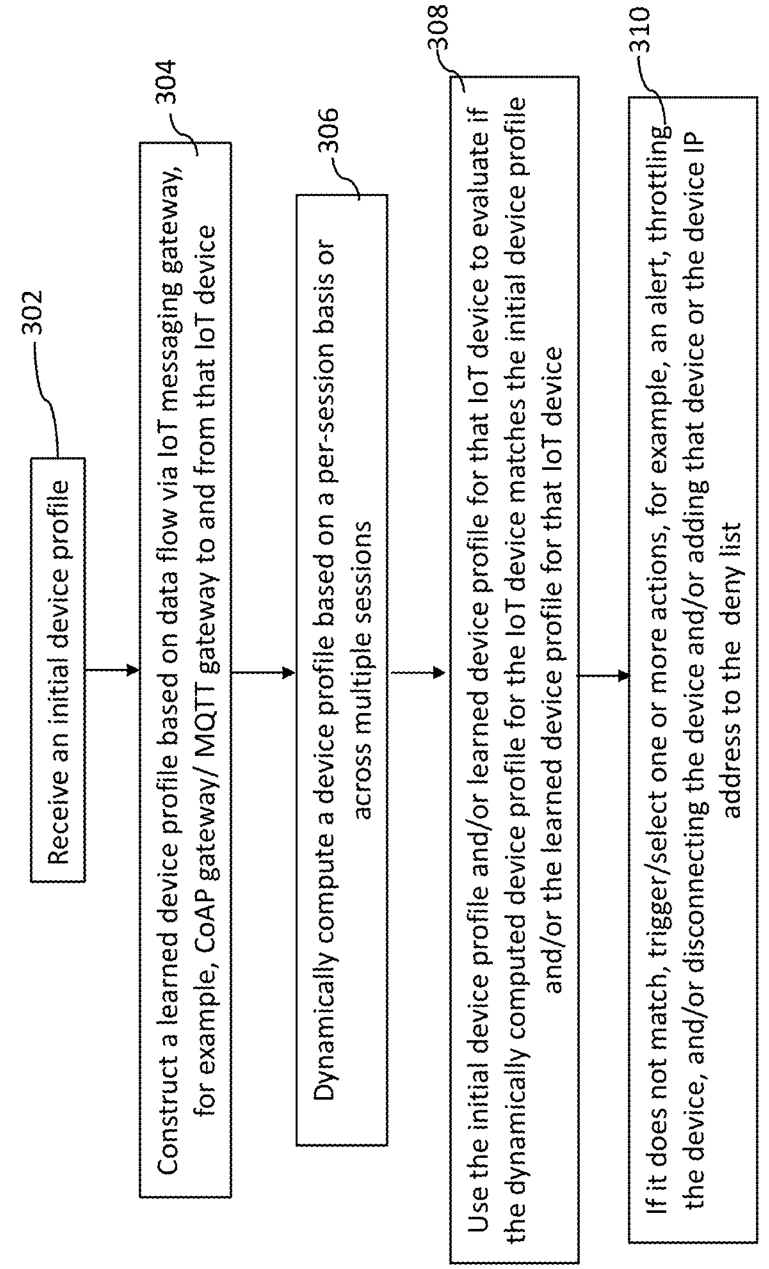
FIGS. 3A and 3B illustrate exemplary processes 300 and 300' for securing connections in systems including M2M or IoT devices in accordance with one or more embodiments of the present invention.
Figure 3B:
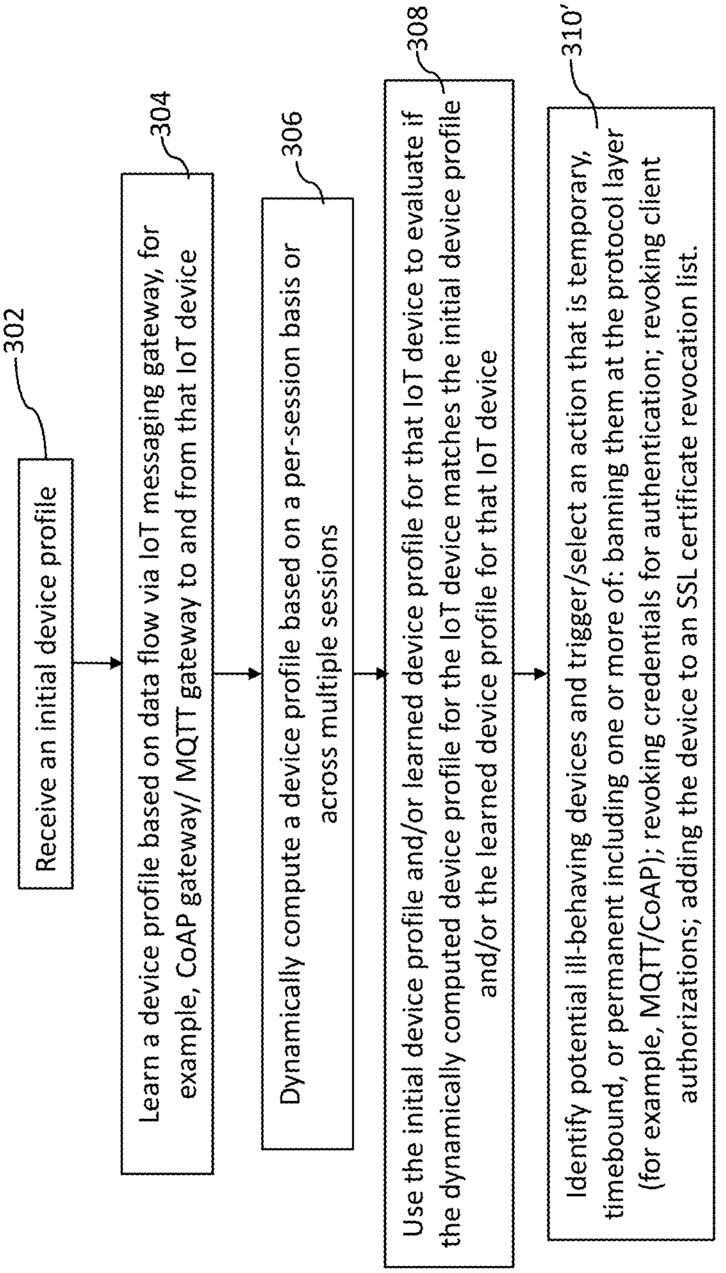

FIGS. 3A and 3B illustrate exemplary processes 300 and 300' used for providing end-to-end security to systems including M2M or IoT devices in accordance with an embodiment of the present invention. Although, FIGS. 3A and 3B illustrate the data flows using CoAP and MQTT as example messaging gateways and protocols; other messaging protocols, including new industry standard protocols as well as proprietary message protocols, may be used in this system and method processes.

In an embodiment, the process 300 uses an IAF that is application aware and can learn the profile of the device traffic on the fly via machine learning as more and more traffic passes through the IoT messaging gateway. The methods 300 and 300' include providing an initial device profile for each IoT device to the IAF via step 302, learning additional device profile based on data flow via IoT messaging gateway, for example, CoAP gateway/MQTT gateway, to and from that IoT device via step 304, dynamically computing a device profile on a per-session basis or across sessions via step 306, and using the initial device profile along with learned device profile for that IoT device to evaluate if the dynamically computed device profile for the IoT device matches the initial device profile and/or the learned device profile for that IoT device via step 308.

This may be achieved by using IAF analyzer, also referred to herein as message analyzer or MAF analyzer, 244 illustrated in FIG. 2A or MAF analyzer 244' illustrated in FIG. 2B, where the information regarding data flow to and from the IoT device is analyzed by, for example, MAF analyzer 244', by validating the payload origin, source IP address, source IMEI, payload size, IoT messaging protocol topics, for example, MQTT topics, IoT messaging protocol payload sizes, for example, MQTT payload sizes, common frequencies used by that device, etc. Depending on the information provided and learned there may be additional rule attributes that are used by the analyzer.

In an embodiment, the initial device profile for at least one IoT device includes one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one IoT device, encryption certificate attributes, network and/or device identifiers, and content and metadata in the data, etc.

In an embodiment, the learned device profile for the at least one IoT device includes one or more of: the number of messages per topic for a duration, the number of messages across topics for a duration, individual payload size per topic and across topics, aggregated payload size per topic or across topics for a duration, authentication attempts, authorization attempts, session duration, fixed checksum/hash of payload per topic and across topics for a duration, network location of the at least one IoT device, encryption certificate attributes, network and/or device identifiers, and content and metadata in the data, etc.

The dynamic computation of a device profile on a per-session basis or across sessions via step 206 may include computing the device profile for the device when a single session is open at a time for the device, multiple sessions are open at a time for the device, or multiple sessions which open and close over a period of time for that device. The device profile may be represented as a per device profile in case of complex device, for example, a vehicle or a connected home, or it may be represented as an aggregated application profile in case of simple devices, for example, connected chair/smart meter. Additionally, or alternatively, the learned device profile may also be an aggregate learned device profile for a group of devices of the same type.

In an embodiment, dynamically computing/detecting the device profile based on a per-session basis or across sessions, includes analyzing ongoing data traffic for the at least one IoT device based on any one or more of: the number of messages per topic for a duration, the number of messages across topics for a duration, the individual payload size per topic and across topics, the aggregated payload size per topic or across topics for a duration, authentication attempts, authorization attempts, session duration, the fixed checksum/hash of payload per topic and across topics for a duration, the network location of the at least one IoT device, encryption certificate attribute change for example, signature changes, cipher changes, subject changes, network and/or device identifiers changes, for example, mismatched network and/or device identifiers, and content and metadata change in the data, for example, illegal values from a sensor, change of units of sensor values, etc. that may be gathered off of a vehicle or IoT device, etc. This dynamically computed profile is then checked against the initial device profile and/or the learned device profile to detect anomalous behavior.

The IAF is provided with the initial device profile. Additionally, the IAF may use the history of dynamically computed device profile and machine learning algorithms to build the learned device profile. It then uses the learned device profile along with the initial device profile to evaluate if the dynamically computed device profile for the IoT device for the current session or sessions matches the expected device profile for that IoT device. If it does not, it may trigger/select an alert and/or a disconnect and add that device or the device IP address to the deny-list. The IoT proxy/broker can look up device profiles on the deny-list to deny subsequent connections to those deny-listed devices. In an embodiment, the MAF analyzer may trigger/select an alert, throttling the device and/or a disconnect and add that device or the device IP address to the deny list. The IoT proxy/broker can look up device profiles on the deny-list to deny subsequent connections to those deny-listed devices via step 310 as illustrated in FIG. 3A, and once selected by the analyzer are implemented by the proxy.

In an embodiment, the message analyzer 244 or MAF analyzer 244' illustrated in FIGS. 2A and 2B respectively, may use the connection and message metadata to identify potential ill-behaving devices and trigger or select actions, which may be temporary, timebound, or permanent, to disconnect and ban such devices via methods that include: banning them at the protocol layer (for example, MQTT/CoAP); revoking credentials for authentication; revoking client authorizations; and/or adding the device to a SSL certificate revocation list via step 310' as illustrated in FIG. 3B, and once selected by the analyzer, the selected action(s) may be implemented by the proxy.

Once the performance of the learned device profiles are validated and improved with ongoing data flow to and from the IoT device, and ongoing data traffic analysis, the learned device profiles may entirely replace the initial device profiles for comparison and use. The disclosed system and method may also use the dynamically computed device profiles to update the learned device profiles as a normal function of machine learning processing to correct for data drift.

In an embodiment, the IAF may be implemented in one place in the cloud. However, it may also be implemented at various positions of the messaging path, as illustrated by FIGS. 2A and 2B, including, for example, cloud, enterprise, home, cell tower (TELCO edge) or the device itself. The initial device profile as well as the learned device profile for the IoT device may be loaded at each layer or at any of the layers.

Thus, in an embodiment, the IAF may be implemented and deployed in layers at one or more positions in the messaging path; including, but not limited to, the IoT device transmitting the data messages; IoT gateway devices receiving the data messages; cell towers receiving the data messages; edge computing systems receiving the data messages; and cloud servers and IoT applications receiving the data messages. Based on its position in the messaging path, the IAF at each layer may receive a different initial profile for the one or more IoT devices and learn a different device profile based on data flow to and from the one or more IoT devices.

The IAF may dynamically compute a device profile on a per-session basis or across sessions based on its position in the messaging path. The IAF may learn a device profile for one or more IoT devices based on data flow to and from the IoT devices from the one or more IoT devices in that IoT application, and/or from the one or more IoT devices in other IoT applications providing similar operational functionality based on its position in the messaging path.

The IAF may then compare the learned device profile for the one or more IoT devices and the initial device profile for the one or more IoT devices, with the current instance of data flow, also referred to as dynamically computed device profile, to and from the IoT devices for the one or more devices and trigger an action if the current instance of data flow for the one or more devices does not match the initial device profile and/or the learned device profile for the one or more IoT devices.

As described above, the initial device profile and/or the learned device profile for the IoT device may be different for each IAF based on its position in the messaging path. Thus, the IAF at each position in each layer may operate differently. It may have a different initial device profile (based on what that position is and what the IAF can look at), different learned device profiles, and take different actions.

A person skilled in the art may understand that although a number of examples of filters and/or attributes for providing end-to-end security to systems including M2M or IoT devices are provided herein, various other attributes may be used and are within the spirit and scope of this invention.

Although the invention is described using protocols such as MQTT and CoAP as examples, a person skilled in the art may readily understand that the invention described here is applicable to other technologies using protocols other than MQTT and CoAP and are within the scope of this invention.

Figure 4:
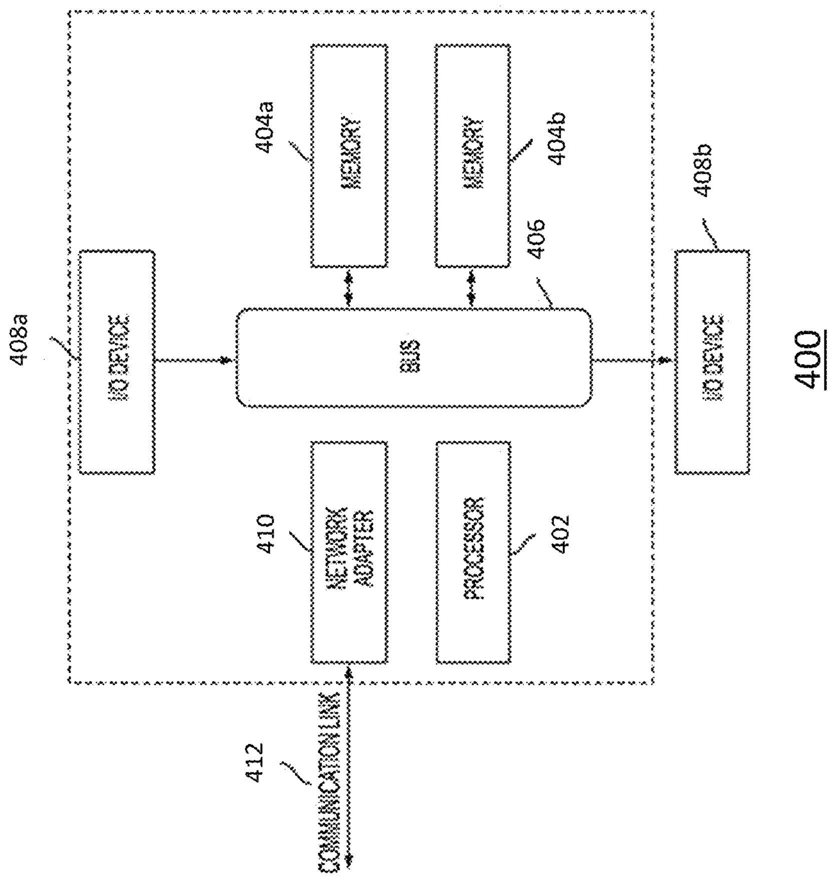
FIG. 4 illustrates a data processing system 400 suitable for storing the computer program product and/or executing program code relating to securing connections in systems including M2M or IoT devices in accordance with one or more embodiments of the present invention.

FIG. 4 illustrates a data processing system 400 suitable for storing the computer program product and/or executing program code in accordance with an embodiment of the present invention. The data processing system 400 includes a processor 402 coupled to memory elements 404*a-b* through a system bus 406. In an embodiment, the data processing system 400 may include more than one processor and each processor may be coupled directly or indirectly to one or more memory elements through a system bus.

Memory elements 404*a-b* can include local memory employed during actual execution of the program code, bulk storage, and cache memories that provide temporary storage of at least some program code in order to reduce the number of times the code must be retrieved from bulk storage during execution. As shown, input/output or I/O devices 408*a-b* (including, but not limited to, keyboards, displays, pointing devices, etc.) are coupled to the data processing system 400. I/O devices 408*a-b* may be coupled to the data processing system 400 directly or indirectly through intervening I/O controllers (not shown).

In FIG. 4, a network adapter 410 is coupled to the data processing system 402 to enable data processing system 402 to become coupled to other data processing systems or remote printers or storage devices through communication link 412. Communication link 412 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk—read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as an M2M network, but not limited thereto) using one or more communication architectures, methods, and networks, including, but not limited to, Code Division Multiple Access (CDMA), Global System for Mobile Communications (GSM), Universal Mobile Telecommunications System (UMTS), Long Term Evolution (LTE), fourth generation cellular systems (4G) LTE, 5G, wireless local area networks (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for securing connections in systems including Machine to Machine (M2M) or Internet of Things (IoT) devices comprising:

receiving a different initial device profile at each layer of an IoT application firewall (IAF) for at least one M2M or IoT device based on a position of the IAF in a messaging path, wherein the IAF is deployed in layers at two or more positions in the messaging path, wherein the two or more positions in the messaging path comprise at least two of: the at least one M2M or IoT device; an IoT gateway device; a cell tower; an edge computing system; a cloud server; or an IoT application;

learning a device profile based on data flow to and from the at least one M2M or IoT device based on the position of the IAF in the messaging path to generate a learned device profile;

dynamically computing a device profile on a per-session basis or across sessions based on the position of the IAF in the messaging path to generate a dynamically computed device profile;

comparing the dynamically computed device profile for the at least one M2M or IoT device with any of: the initial device profile and the learned device profile for the at least one M2M or IoT device, or a combination thereof; and in response to determining that the dynamically computed device profile for the at least one M2M or IoT device at a position does not match any of the initial device profile at that position, the learned device profile at that position, or a combination thereof, for the at least one IoT device, triggering an action.

2. The method of claim 1, further comprising: augmenting the dynamically computed device profile based on data in the data flow to and from the at least one M2M or IoT device.

3. The method of claim 1, wherein any one or more of the initial device profile and the learned device profile are the same or different for the at least one M2M or IoT device based on location of the IAF in the messaging path.

4. The method of claim 1, wherein any one or more of the initial device profile and the learned device profile comprises an aggregate initial device profile, an aggregate learned device profile for a group of devices of the same type, or a combination thereof.

5. The method of claim 1, wherein the initial device profile for the at least one M2M or IoT device includes one or more of: number of messages per topic for a duration, number of messages across topics for a duration, individual payload size per topic and across topics, aggregated payload size per topic or across topics for a duration, authentication attempts, authorization attempts, session duration, fixed checksum of payload per topic and across topics for a duration, network location of the at least one device, encryption certificate attributes, network or device identifiers, and content metadata in the data.

6. The method of claim 1, wherein the learned device profile for the at least one M2M or IoT device includes one or more of: number of messages per topic for a duration, number of messages across topics for a duration, individual payload size per topic and across topics, aggregated payload size per topic or across topics for a duration, authentication attempts, authorization attempts, session duration, fixed checksum of payload per topic and across topics for a duration, network location of the at least one M2M or IoT device, encryption certificate attributes, network and/or device identifiers, and content metadata in the data.

7. The method of claim 1, wherein dynamically computing the device profile based on a per-session basis or across sessions, includes analyzing ongoing data traffic for the at least one M2M or IoT device based on any one or more of: number of messages per topic for a duration, number of messages across topics for a duration, the individual payload size per topic and across topics, aggregated payload size per topic or across topics for a duration, authentication attempts, authorization attempts, session duration, fixed checksum of payload per topic and across topics for a duration, network location of the at least one M2M or IoT device, encryption certificate attribute change, network and/or device identifiers changes, and content metadata change in the data.

8. The method of claim 1, wherein the action includes one or more of: triggering an alert, throttling the device, disconnecting the at least one M2M or IoT device; and adding the at least one M2M or IoT device or an IP address for the M2M or IoT device to a deny list of devices.

9. The method of claim 1, further including: identifying the at least one M2M or IoT device as an ill-behaving device and triggering temporary, timebound, or permanent actions, including any one or more of: banning the at least one M2M or IoT device at a protocol layer; revoking credentials for authentication; revoking client authorizations; and adding the at least one M2M or IoT device to a secure sockets layer (SSL) certificate revocation list.

10. A system for securing connections in systems including Machine to Machine (M2M) or Internet of Things (IoT) devices, wherein the system for securing connections in systems including M2M or IoT devices comprises:

at least one M2M or IoT device; and an IoT application firewall (IAF) comprising one or more data processing systems configured to implement a proxy and a message analyzer, wherein the IAF is deployed in layers at two or more positions in the messaging path, wherein the two or more positions in the messaging path comprise at least two of: the at least one IoT device; an IoT gateway device; a cell tower; an edge computing system; a cloud server; or an IoT application, and wherein the proxy is configured to:

dynamically compute a device profile from data flow to and from the at least one M2M or IoT device on a per-session basis or across sessions based on a position of the IAF in a messaging path to generate a dynamically computed device profile; and implement an action triggered by the message analyzer;

wherein the message analyzer is configured to:

receive a different initial device profile at each layer of the IAF for the at least one M2M or IoT device;

learn the device profile based on the data flow to and from the at least one M2M or IoT device based on the position of the IAF in the messaging path to generate a learned device profile;

compare the dynamically computed device profile for the at least one M2M or IoT device with any of the initial device profile and the learned device profile for the at least one M2M or IoT device or a combination thereof; and in response to determining that the dynamically computed device profile for the at least one M2M or IoT device at a position does not match any of the initial device profile at that position, the learned device profile at that position, or a combination thereof, for the at least one M2M or IoT device, trigger an action.

11. The system of claim 10, wherein the message analyzer augments the dynamically computed device profile based on data in the data flow to and from the at least one M2M or IoT device.

12. The system of claim 10, wherein any one or more of the initial device profile and the learned device profile are the same or different for the at least one M2M or IoT device based on location of the IAF in the messaging path.

13. The system of claim 10, wherein any one or more of the initial device profile and the learned device profile comprises an aggregate initial device profile, an aggregate learned device profile for a group of devices of the same type, or a combination thereof.

14. The system of claim 10, wherein the initial device profile for the at least one M2M or IoT device includes one or more of: number of messages per topic for a duration, number of messages across topics for a duration, individual payload size per topic and across topics, aggregated payload size per topic or across topics for a duration, authentication attempts, authorization attempts, session duration, fixed checksum of payload per topic and across topics for a duration, network location of the at least one M2M or IoT device, encryption certificate attributes, network or device identifiers, and content metadata in the data.

15. The system of claim 10, wherein the learned device profile for the at least one M2M or IoT device includes one or more of: number of messages per topic for a duration, number of messages across topics for a duration, individual payload size per topic and across topics, aggregated payload size per topic or across topics for a duration, fixed checksum of payload per topic and across topics for a duration, network location of the at least one M2M or IoT device, encryption certificate attributes, network or device identifiers, and content metadata in the data.

16. The system of claim 10, wherein dynamically computing the device profile based on a per-session basis or across sessions includes analyzing ongoing data traffic for the at least one M2M or IoT device based on any one or more of: number of messages per topic for a duration, number of messages across topics for a duration, individual payload size per topic and across topics, aggregated payload size per topic or across topics for a duration, authentication attempts, authorization attempts, session duration, fixed checksum of payload per topic and across topics for a duration, network location of the at least one M2M or IoT device, encryption certificate attribute change, network and/or device identifiers changes, and content metadata change in the data.

17. The system of claim 10, wherein the action includes one or more of: triggering an alert, throttling the device disconnecting the at least one M2M or IoT device; and adding the at least one M2M or IoT device or an IP address for the IoT to a deny list of devices.

18. The system of claim 10, wherein the IAF is further configured to: identify the at least one M2M or IoT device as an ill-behaving device and trigger temporary, timebound, or permanent actions including any one or more of: banning the at least one M2M or IoT device at a protocol layer; revoking credentials for authentication; revoking client authorizations; and adding the at least one M2M or IoT device to a secure sockets layer (SSL) certificate revocation list.

19. A computer program product stored on a non-transitory computer readable medium for securing connections in systems including Machine to Machine (M2M) or Internet of Things (IoT) devices, comprising computer readable instructions for causing a computer to control an execution of an application for securing connections in systems including M2M or IoT devices comprising:

receiving a different initial device profile at each layer of an IoT application firewall (IAF) for at least one M2M or IoT device based on a position of the IAF in a messaging path, wherein the IAF is deployed in layers at two or more positions in the messaging path, wherein the two or more positions in the messaging path comprise at least two of: the at least one M2M or IoT device; an IoT gateway device; a cell tower; an edge computing system; a cloud server; or an IoT application;

learning a device profile based on data flow to and from the at least one M2M or IoT device based on the position of the IAF in the messaging path to generate a learned device profile;

dynamically computing a device profile on a per-session basis or across sessions based on the position of the IAF in the messaging path to generate a dynamically computed device profile;

comparing the dynamically computed device profile for the at least one M2M or IoT device with any of: the initial device profile and the learned device profile for the at least one M2M or IoT device, or a combination thereof; and in response to determining that the dynamically computed device profile for the at least one M2M or IoT device at a position does not match any of: the initial device profile at that position, the learned device profile at that position, or a combination thereof, for the at least one M2M or IoT device, triggering an action.

20. The computer program product of claim 19, further comprising: augmenting the dynamically computed device profile based on data in the data flow to and from the at least one M2M or IoT device.

21. The computer program product of claim 19, wherein any one or more of: the initial device profile and the learned device profile are the same or different for the at least one M2M or IoT device based on location of the IAF in the messaging path.

22. The computer program product of claim 19, wherein any one or more of: the initial device profile and learned device profile comprises an aggregate initial device profile, an aggregate learned device profile for a group of devices of the same type, or a combination thereof.

23. The computer program product of claim 19, wherein the initial device profile for the at least one M2M or IoT device includes one or more of: number of messages per topic for a duration, number of messages across topics for a duration, individual payload size per topic and across topics, aggregated payload size per topic or across topics for a duration, authentication attempts, authorization attempts, session duration, fixed checksum of payload per topic and across topics for a duration, network location of the at least one M2M or IoT device, encryption certificate attributes, network or device identifiers, and content metadata in the data.

24. The computer program product of claim 19, wherein the learned device profile for the at least one M2M or IoT device includes one or more of: number of messages per topic for a duration, number of messages across topics for a duration, individual payload size per topic and across topics, aggregated payload size per topic or across topics for a duration, fixed checksum of payload per topic and across topics for a duration, network location of the at least one M2M or IoT device, encryption certificate attributes, network or device identifiers, and content metadata in the data.

25. The computer program product of claim 19, wherein dynamically computing the device profile on a per-session basis or across sessions includes analyzing ongoing data traffic for the at least one M2M or IoT device based on any one or more of: number of messages per topic for a duration, number of messages across topics for a duration, individual payload size per topic and across topics, aggregated payload size per topic or across topics for a duration, authentication attempts, authorization attempts, session duration, fixed checksum of payload per topic and across topics for a duration, network location of the at least one M2M or IoT device, encryption certificate attribute change, network or device identifiers change, and content metadata change in the data.

26. The computer program product of claim 19, wherein the action includes one or more of: triggering an alert, throttling the device disconnecting the at least one M2M or IoT device; and adding the at least one M2M or IoT device or an IP address for the at least one M2M or IoT device to a deny list of devices.

27. The computer program product of claim 19, further including: identifying the at least one M2M or IoT device as an ill-behaving device and triggering temporary, timebound, or permanent actions including any one or more of: banning the at least one M2M or IoT device at a protocol layer; revoking credentials for authentication; revoking client authorizations; and adding the at least one M2M or IoT device to a secure sockets layer (SSL) certificate revocation list.

* * * * *